United States Patent [19]
Klein

[11] Patent Number: 5,632,892
[45] Date of Patent: May 27, 1997

[54] PORTABLE REVERSE OSMOSIS WATER PURIFICATION PLANT

[75] Inventor: Kim C. Klein, Hammond, La.

[73] Assignee: Mechanical Equipment Company, Inc., New Orleans, La.

[21] Appl. No.: 545,305

[22] Filed: Oct. 19, 1995

[51] Int. Cl.⁶ .................................................. B01D 63/00
[52] U.S. Cl. ..................... 210/257.2; 210/257.1; 210/108; 210/241; 210/244
[58] Field of Search .................... 210/652, 257.2, 210/199.2, 241, 244, 256, 262, 696, 754, 257.1, 108

[56] References Cited

U.S. PATENT DOCUMENTS

| | | | |
|---|---|---|---|
| 3,839,206 | 10/1974 | Welch | 210/185.2 |
| 4,219,419 | 8/1980 | Sweeny | 210/754 |
| 4,434,057 | 2/1984 | Marquardt | 210/638 |
| 4,574,049 | 3/1986 | Pittner | 210/195.2 |
| 4,810,388 | 3/1989 | Trasen | 210/257.2 |
| 4,959,155 | 9/1990 | Gomez | 210/696 |
| 5,174,901 | 12/1992 | Smith | 210/257.2 |
| 5,244,575 | 9/1993 | Horner et al. | 210/65.2 |
| 5,344,566 | 9/1994 | Clancey | 210/257.2 |
| 5,344,617 | 9/1994 | Johnson | 422/172 |

*Primary Examiner*—Ana Fortuna
*Attorney, Agent, or Firm*—Wood, Phillips, Van Santen, Clark & Mortimer

[57] ABSTRACT

An improved portable reverse osmosis water purification plant includes a frame 10 with a storage area 20 thereon adapted to receive a feedwater pump 76 and a product water pump 78. A diesel engine 44 is located on the frame 10 along with a high pressure pump 52 which is driven thereby. A primary filter 70 is located on the frame 10 and is connected to the feedwater pump 76 to receive water to be purified therefrom. A secondary filter 72 is also located on the frame 10 and is of the cartridge type. The same delivers water to be purified to the high pressure pump 52, which in turn provides the water to be purified to membrane/pressure vessels 60 located on the frame.

9 Claims, 4 Drawing Sheets

PORTABLE REVERSE OSMOSIS WATER PURIFICATION PLANT

FIELD OF THE INVENTION

This invention relates to water purification, and more particularly, to a portable, reverse osmosis water purification plant.

BACKGROUND OF THE INVENTION

Reverse osmosis, as a procedure for the purification of liquids, particularly water, has gained favor in the last two or three decades. Unlike evaporation plants that have been used for the purification of seawater, reverse osmosis equipment does not require a source of heat energy. Rather, virtually any type of prime mover may be utilized to operate a pump capable of pressurizing the liquid to be purified to the requisite pressure. Consequently, reverse osmosis units, and the locations in which they are operated, are not limited by the presence or absence of heat energy.

In addition, reverse osmosis purification equipment is readily sized for particular applications simply by providing the requisite area of membrane and a pump of appropriate capacity. Because of these characteristics, reverse osmosis purification units are ideally suited for installation at remote sites to which they may be transported, without disassembly, and put into immediate operation.

One such unit is the ROWPU (Reverse Osmosis Water Purification Unit) developed in 1979. ROWPU units were trailer mounted and included a diesel driven electrical generator. The electrical generator is employed to operate six electrically operated pumps, including two raw water pumps, a backwash pump for a primary filter, a feedwater booster pump for providing feedwater at a relatively low pressure, a high pressure pump for elevating the pressure of the feedwater to a pressure whereat reverse osmosis can occur at an economically practical rate, and a product water pump. The ROWPU also had an automatic, timer operated, backwash system for the primary filter. A number of its components were made of fiberglass so as to avoid corrosion problems. However, the use of fiberglass construction gave rise to mechanical weakness and increased rates of mechanical failure. Furthermore, in operation, the unit was noisy due to the noise made by the diesel operated electrical generator, and the use of extensive electrical systems resulted in a unit having substantial complexity with a high rate of mean time between failures.

The present invention is directed to overcoming one or more of the above problems.

SUMMARY OF THE INVENTION

It is a principal object of the invention to provide a new and improved portable reverse osmosis water purification plant.

An exemplary embodiment of the invention achieves the foregoing objects in a plant construction that includes a frame. Means define a storage area on the frame which is adapted to receive feedwater and product water pumps and prime movers therefor. A diesel engine is disposed on the frame and a high pressure pump is also located on the frame to be connected to the diesel engine to be driven thereby. A primary filter is disposed on the frame. The primary filter is of the backwashable type and is connectable to the feedwater pump to receive water to be purified therefrom. A secondary filter is also disposed on the frame. The secondary filter is of the cartridge type and is connected to the primary filter to receive water to be purified therefrom, as well as to the high pressure pump to provide the water to be purified thereto. A membrane/pressure vessel is located on the frame and has an inlet connected to the high pressure pump to receive, under high pressure, the water to be purified. The membrane/pressure vessel includes an outlet to discharge purified water, and the outlet is adapted to be connected to the product water pump.

In a preferred embodiment, a housing is located on the frame and the foregoing components are all contained within the housing. As a consequence, operational noise is substantially reduced.

The invention also contemplates the provision of a drawback tank within the housing. The drawback tank is connected to the outlet of the membrane/pressure vessel to receive purified water therefrom. The outlet is adapted to be connected to the product water pump via the drawback tank.

In a highly preferred embodiment, the diesel engine has a self-contained electrical system including an alternator. One or more electrically operated injection pumps for injecting a treatment chemical into the water to be purified is included, and each injection pump is connected to the alternator to be powered thereby.

Preferably, there are at least two treatment chemical reservoirs in the housing, with one of the electrically operated injection pumps being provided for each of the reservoirs.

In a preferred embodiment of the invention, an accumulator is connected to the inlet side of the high pressure pump.

In a preferred embodiment, an accumulator is connected to the outlet side of the high pressure pump.

In a highly preferred embodiment, there are accumulators located on both sides of the high pressure pump to smooth the flow of the water to be purified and dampen pressure pulses therein.

In one embodiment of the invention, the secondary filter includes a canister for receiving a cartridge. The canister is formed of a copper/nickel alloy.

Other objects and advantages will become apparent from the following specification taken in connection with the accompanying drawings.

DESCRIPTION OF THE PREFERRED EMBODIMENT

Figure 1:
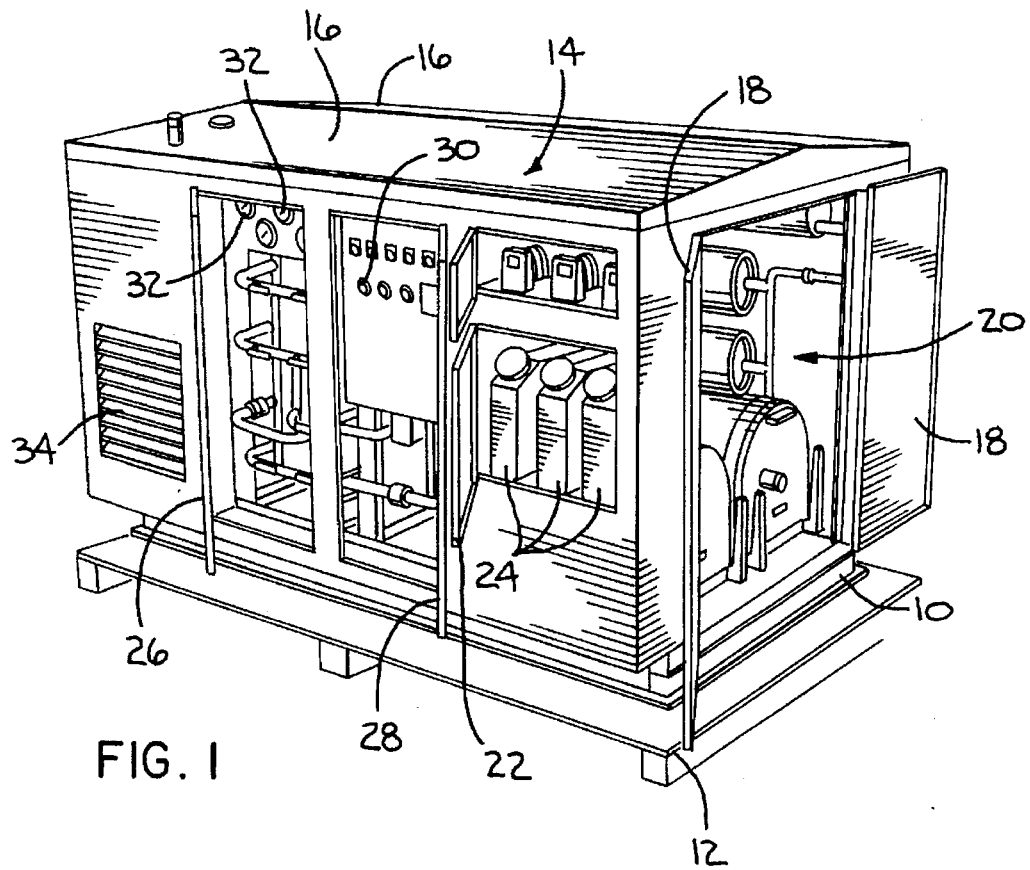
FIG. 1 is a perspective view of a portable reverse osmosis water purification plant made according to the invention.

An exemplary embodiment of a reverse osmosis water purification plant made according to the invention is illustrated in the drawings and with reference to FIGS. 1–4, inclusive, includes a rectangular frame 10 made of channels or the like. As seen in FIG. 1, the frame 10 may be mounted on a skid 12 for transportation purposes. Alternatively, the same may be mounted on a wheeled trailer so that the same may be easily transported.

Mounted on the frame 10 is a housing, generally designated 14. The housing 14 is made up of metal panels, preferably of aluminum, so as to be lightweight. The roof panels 16 are removable, while a number of the sides include doors such as doors 18 which may open to reveal a storage area, generally designated 20. A door panel 22 may be opened to reveal three reservoirs 24 which may be employed to contain treatment chemicals used in the water purification process. Other door panels 26 and 28 are openable to receive other components of the system including a control panel, various gauges 32, and the like.

One of the side panels may also include a louvered vent opening 34 for purposes to be seen.

Figure 2:
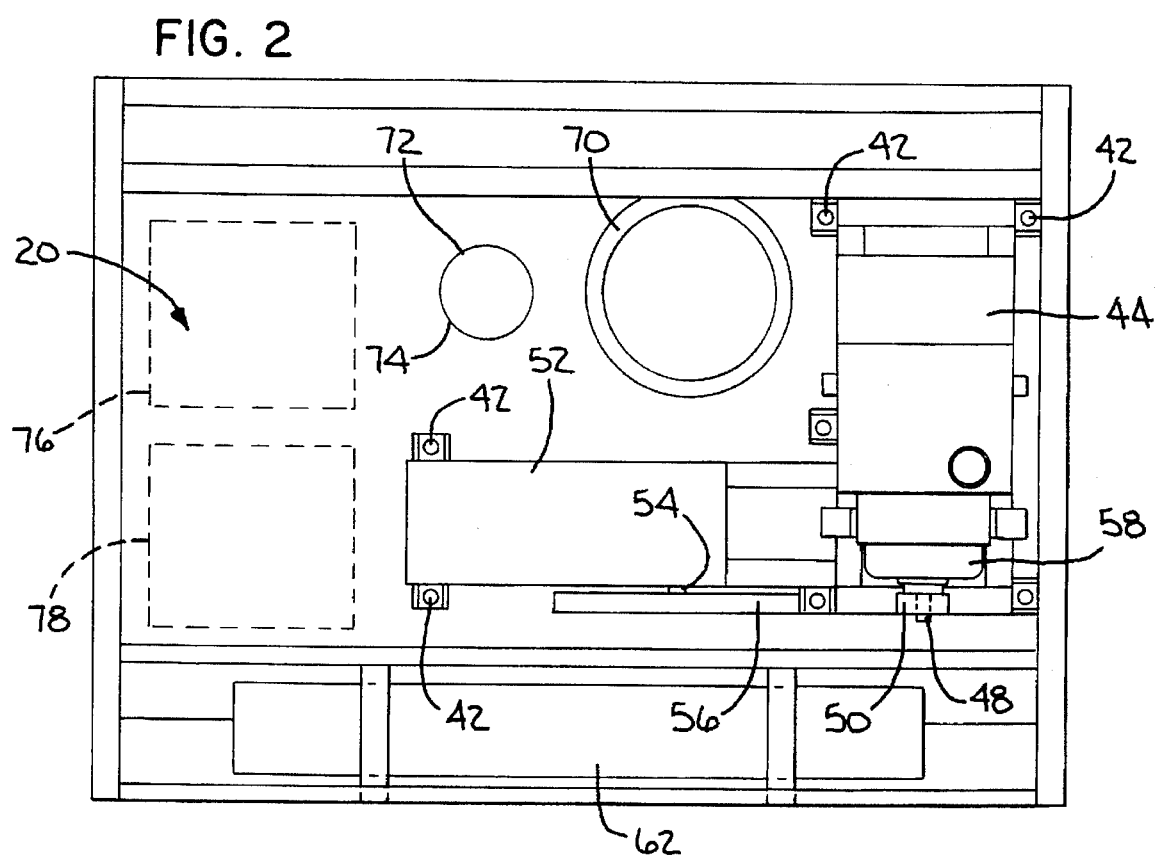
FIG. 2 is a plan view of the interior of the unit.
Figure 3:
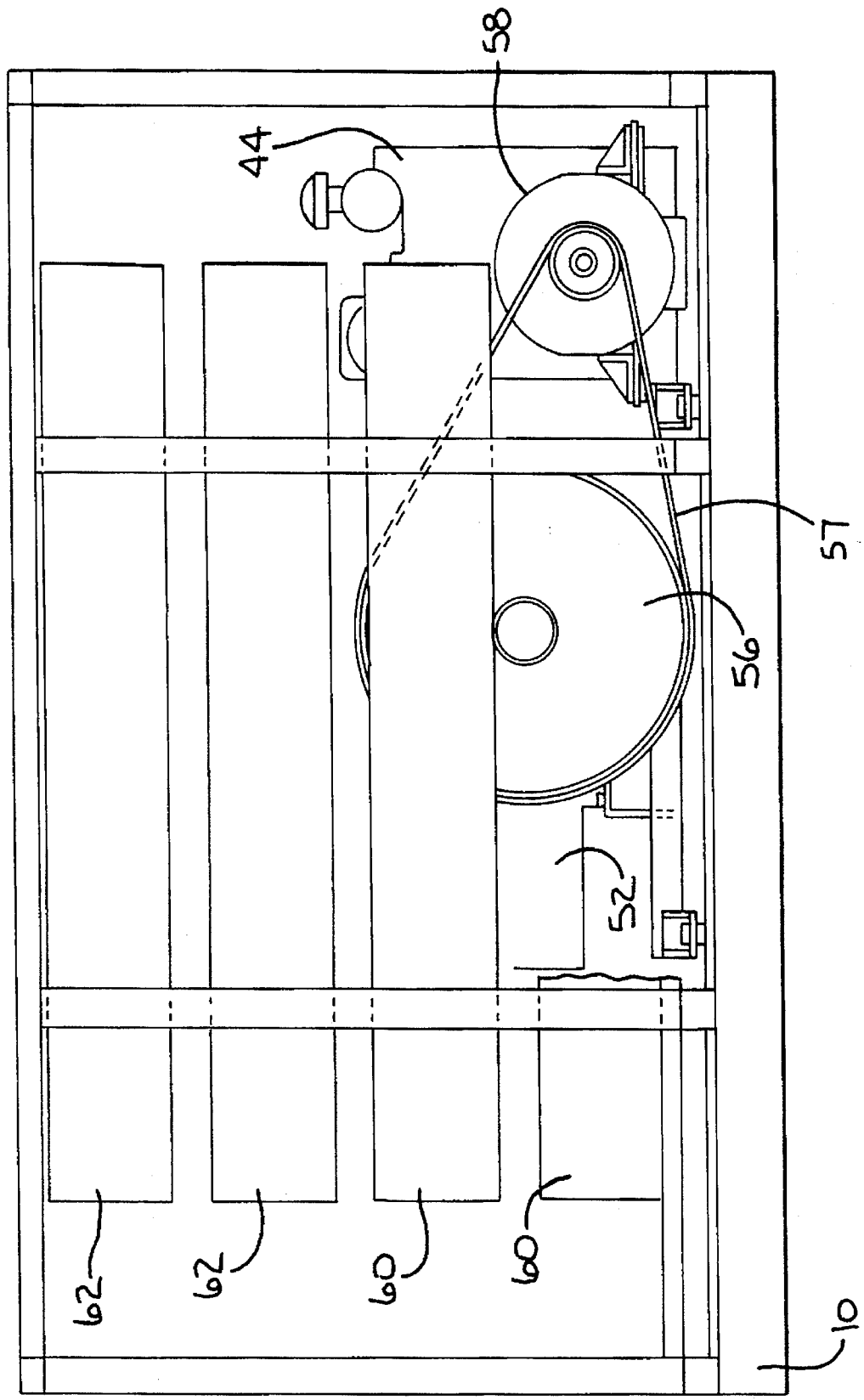
FIG. 3 is a side elevation of the interior of the unit as viewed from the bottom of FIG. 2.
Figure 4:
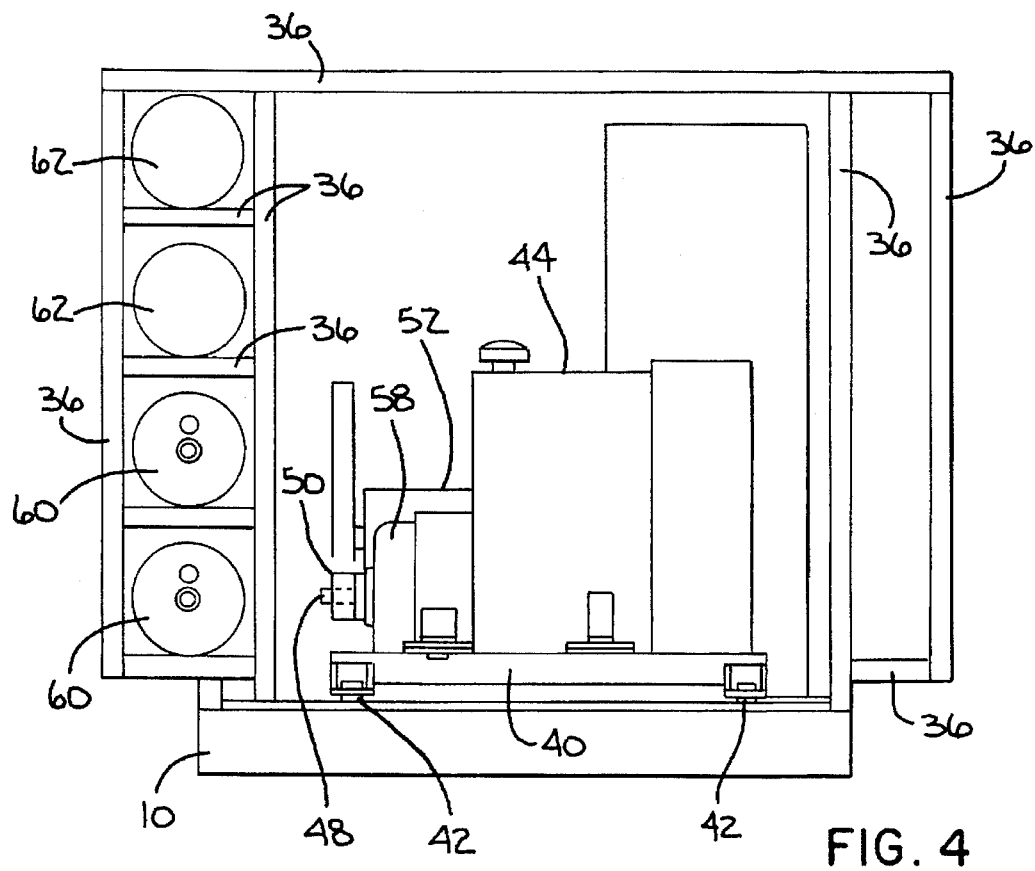
FIG. 4 is a side elevation of the interior of the unit as viewed from the right of FIG. 3.
Figure 6:
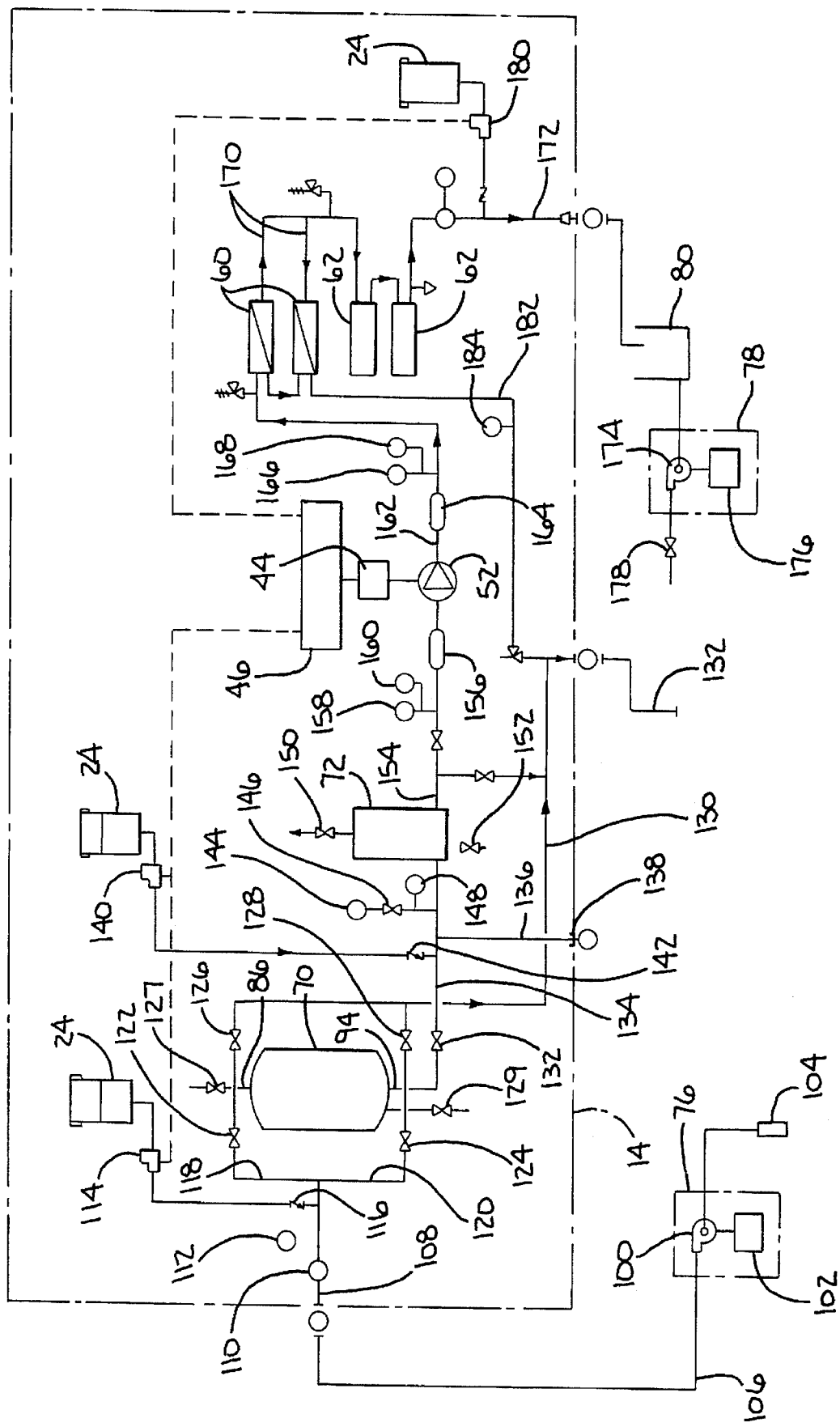
FIG. 6 is a piping diagram of the plant.

Turning to FIGS. 2, 3, and 4, the frame 10 mounts various metallic frame members, collectively given the reference numeral 36, which in turns mounts the many panels and/or doors just described. In addition, components of the system contained within the housing 14 may be mounted on the frame 10 or the frame members 36. For example, an engine mount 40 is mounted by vibration isolating grommets 42 to the frame 10 and support a diesel engine 44. As illustrated in FIG. 6, the diesel engine 44 includes a self-contained electrical system with an alternator 46 for purposes to be seen. Combustion and cooling air for the engine 44 enters the housing 14 through the vent opening 34.

The diesel engine includes an output shaft 48 on which a sheave 50 is mounted.

Also mounted on the frame 10 within the housing 14 is a high pressure pump 52. Again, vibration isolating grommets 42 are employed. The high pressure pump 52 preferably is of the reciprocating plunger type. One suitable pump is the model TD-28 Triplex reciprocating plunger pump made by the Union Pump Company.

The pump has an inlet shaft 54 to which a sheave 56 is attached. A timing belt 57 (FIG. 3) may be employed to couple the diesel engine 44 to the pump 52 so that the former may drive the latter. In this regard, a manually operable clutch 58 is preferably included in the drive train of the engine 44.

Also contained within the housing 14 is a pair of membrane/pressure vessel assemblies 60 as well as a pair of drawback tanks 62. The membrane/pressure vessel assemblies in one embodiment are DuPont B10 Hollow Fine Fiber membranes available from E. I. DuPont de Nemours. Alternatively, however, Dow Filmtec Spiral Wound membranes may also be employed, in which case the drawback tanks 62 may not be required.

The drawback tanks 62 provide a source of pure water that may osmose back through the membrane/pressure vessels when the system is not in use. This prevents the membranes from drying out when the system is not operating.

Looking specifically at FIG. 2, within the interior of the housing 14 is a primary filter 70 of the multi-media type to be described in greater detail hereinafter. A secondary filter 72 is located within the housing 14 next to the primary filter 70 so as to leave the storage area 20 relatively unobstructed. The secondary filter 72 includes a filter canister 74 adapted to receive a cartridge. The canister 74 is preferably made of a copper/nickel alloy, preferably, 90/10 copper/nickel alloy. This provides excellent mechanical strength as well as corrosion resistance.

As shown in FIG. 2, within the storage area 20, a pair of identical pumps and associated prime movers may be removably located. One of the pumps is designated 76 and may constitute a feedwater pump driven by a small diesel engine. The second pump is designated 78 and constitutes a product water pump, also driven by a small diesel engine. Though not shown in FIG. 2, the storage area 20 may also house a collapsible product water containing bladder, shown schematically in FIG. 6 at 80.

Figure 5:
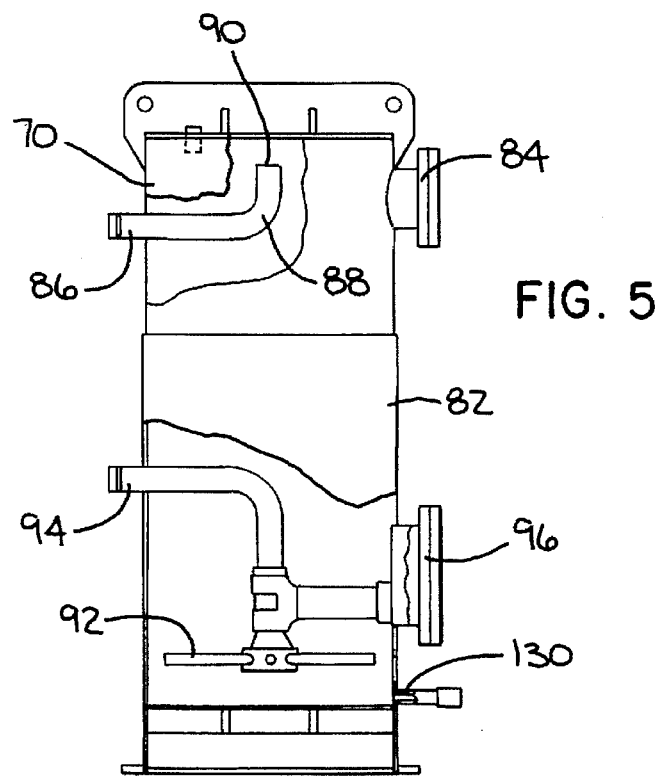
FIG. 5 is a sectional view of a primary filter employed in the invention.

Turning now to FIG. 5, the primary filter will be described. The same includes a generally cylindrical vessel 82. The vessel 82 includes a cover or a sight glass port 84 near its upper end. Oppositely of the cover 84, a port 86 enters the vessel and includes an elbow 88 and an open end 90 directed toward the top of the vessel 82.

Near the bottom of the vessel, a spider-like distributor 92 is located and is connected to a port 94. An access opening 96 is provided. A suitable media (not shown) is disposed within the vessel 82 to overlie the distributor 92.

In normal operation, the water to be purified will be admitted to the vessel 82 via the port 86 and withdrawn via the port 94. The filter media, which may be as simple as sand, will cause relatively larger impurities to be filtered from the water. Of course, those skilled in the art will recognize the primary filter 70 as being of the backwashable type, meaning that if the flow of water through the filter 70 is reversed by causing water to enter through the port 94 and leave through the port 86, accumulated sediment caused by the filtering process will be washed out of the media and exit the filter via the port 86 to clean the media, as is well known.

Turning now to FIG. 6, the manner in which the foregoing components are connected in the system will be described. The feedwater pump 76 includes a centrifugal pump 100 operated by a small diesel engine 102. The inlet to the pump 100 may include a suction strainer 104 which may be located in the source of water to be purified. A flexible hose 106 extends from the pump 76 and is connected by any suitable coupling to an inlet line 108 within the housing 14. Incoming flow may be measured by a flow meter 110 and inlet pressure indicated by a pressure gauge 112.

An electrically operated injector pump 114 is connected to one of the reservoirs 24 and employed, in connection with a check valve 116, to introduce a coagulant or flocculent into the incoming water stream.

The line 108 then proceeds to divide into two lines 118 and 120 which respectively extend through manually operable valves 122 and 124 to the ports 86 and 94 of the primary filter 70. Manually operable valves 126 and 128 are respectively connected to the ports 86 and 94 and extend via a line 130 to a discharge hose 132.

Also included are a manually operable vent valve 127 connected to the port 186 and a manually operable valve 129 connected to a drain line 130 (FIG. 5).

Those skilled in the art will readily appreciate that through appropriate manipulation of the valves 122, 124, 126, and 128, the primary filter 70 may be rigged for filtration or for backwashing. For filtration, the valve 122 will be opened while the valves 124, 126, and 128 will typically be closed. However, if it is desired to discharge incoming water, the valve 128 may be opened.

For backwashing purposes, the valve 122 is closed, while the valve 124 opened. The valve 128 will be closed and the valve 126 opened.

As is well known, it is frequently desired to vent a filter at the beginning of a backwash process, and when that is required the valve 127 may be opened.

To drain the filter 70 as, for example, for transportation purposes or to prevent freezing when the system is not operating, the valve 129 may be opened.

Filtered water from the primary filter 70 passes through a manually operated valve 132 in a line 134 that extends to the inlet of the cartridge filter 72. A cleaning inlet line 136 that is normally closed with a cap 138 is provided, as is a connection to another of the reservoirs 24 (FIG. 1) via an electrically operated injection pump 140 and a check valve 142. An anti-sealant chemical may be retained in the reservoir and injected into the line 134 by the injection pump 140 which, like the pump 114, is connected to the alternator 46, to receive electrical energy therefrom. Desirably, a silt density indicator 144 of conventional construction is connected via a valve 146 to the line 134. A pressure gauge 148 is also provided to indicate pressure in the line 134.

The cartridge filter is provided with vent and drain valves 150 and 152, respectively, and directs filtered water out on a line 154. The cartridge filter 72 is, as mentioned earlier, a secondary filter and its purpose is to remove smaller particulate from the water.

The line 154 extends to an accumulator 156 on the inlet side of the high pressure pump 52. Between the cartridge filter 72 and the accumulator 156 is a pressure gauge 158 and a low pressure switch 160. The low pressure switch 160 is connected into the system so that if the pressure in the line 154 falls below a certain level, the entire system will be shut down.

The outlet side of the high pressure pump 52 is connected to a line 162 which includes another accumulator 164, a pressure gauge 166 and a high pressure switch 168. The high pressure switch 168 is operable to shut down the system if a predetermined pressure is exceeded.

The accumulators 156 and 164 are employed to smooth out pressure pulses and flow in the system that result from the use of a plunger-type pump as the high pressure pump 52.

From the accumulator 164, the water to be purified, now under high pressure, is directed to the membrane/pressure vessels 60. Reverse osmosis occurs in the membrane/pressure vessels 60 and purified water exits the same on lines 170 which extend to the drawback tanks 62. After the drawback banks 62 are filled, purified water is then directed along a line 172 to the storage bladder 80. The product water pump 78 is connected to the bladder 80 and includes a centrifugal pump 174 and a diesel engine 176 to drive the same. The outlet of the centrifugal pump 174 includes a manually operable valve 178 which may be connected into any suitable distribution system.

If desired, one of the treatment chemical reservoirs 24 may be connected to a third electrically operated injection pump 180 which connects to the line 172. A chlorinating chemical may be stored in the appropriate reservoir 24 and the injection pump 180, utilizing electric power from the alternator 46, employed to inject the chlorinating compound into the product water.

Returning to the membrane/pressure vessel 60, a high salinity waste water line 182 extends to the line 132 and serves as a means whereby the concentrated feedwater may be discharged from the system. The line 182 may include a pressure gauge 184, if desired.

From the foregoing, it will be readily appreciated that a reverse osmosis water purification plant made according to the invention is extremely simple, and therefore reliable. The use of the self-contained electrical system of the diesel engine 44 to provide electrical power for instrumentation and the operation of the injection pumps eliminates the need for a separate generator, as well as a source of noise, in terms of the engine required to drive the same.

The use of manual valving is of significant benefit in terms of reducing the complexity of the system and eliminating failure prone components.

Use of copper/nickel alloys in various locations, as, for example, the canister 74 of the secondary filter 72, provides excellent corrosion resistance along with enhanced mechanical strength.

The use of the housing 14 provides a reduction in noise in that the diesel engine that drives the high pressure pump is enclosed.

Furthermore, if, in a preferred embodiment, the diesel engine 44 is chosen so that it can operate at half its maximum speed and power output, reliability is increased while noise is reduced. By the same token, if the pump is chosen to operate at only 65% of its maximum rated speed, increased reliability results.

The use of a diesel engine 44 as the drive for the pump 52 makes it extremely easy to vary capacity of the system simply by altering engine speed. In particular, engine speed may be adjusted to provide a nominal production rate with the engine, pump and reverse osmosis membranes operating at conservative levels for maximum reliability. Alternatively, engine speed may be increased to provide a higher output for critical periods, with the engine, pump and reverse osmosis membranes operating at their maximum performance levels. In contrast, in electrical systems, failure prone motor control systems are required to achieve the same flexibility.

The provision of the storage area 20 serves as an excellent means for containing equipment such as the feedwater and product pumps 76, 78, the water storage bladder 80, et cetera, when the unit is being transported.

A preferred embodiment of the invention weighs almost one-third less than the prior art ROWPU device and yet provides approximately a one-third increase in capacity to produce purified water. It is therefore apparent that the invention does, indeed, achieve its objects.

I claim:

1. A portable reverse osmosis water purification plant comprising:

a frame;

a housing on said frame;

a storage area in said housing adapted to receive feed water and product water pumps, and internal combustion engines therefor;

a diesel engine in said housing;

a high pressure pump within said housing and mechanically coupled to said diesel engine to be driven thereby;

a primary filter in said housing, said primary filter being a backwashable filter and being connectable to said feed water pump to receive water to be purified therefrom;

a secondary filter in said housing, said secondary filter being a cartridge filter and being connected to said primary filter to receive water to be purified therefrom and to said high pressure pump to provide the water to be purified thereto;

a membrane/pressure vessel having a reverse osmosis membrane and located in said housing and having an inlet connected to said high pressure pump to receive, under high pressure, the water to be purified, and an outlet to discharge purified water;

said outlet adapted to be connected to said product water pump;

at least two treatment reservoirs in said housing; and an electrically operated injection pump for each of said reservoirs.

2. A portable reverse osmosis water purification plant comprising:

a frame;

a housing on said frame;

a storage area in said housing adapted to receive feed water and product water pumps and internal combustion engines therefor;

a diesel engine in said housing;

a high pressure pump within said housing and mechanically coupled to said diesel engine to be driven thereby;

a primary filter in said housing, said primary filter being a backwashable filter and being connectable to said feed water pump to receive water to be purified therefrom;

a secondary filter in said housing, said secondary filter being a cartridge filter and being connected to said primary filter to receive water to be purified therefrom and to said high pressure pump to provide the water to be purified thereto;

a membrane/pressure vessel having a reverse osmosis membrane and located in said housing and having an inlet connected to said high pressure pump to receive, under high pressure, the water to be purified, and an outlet to discharge purified water;

said outlet adapted to be connected to said product water pump; and an accumulator connected between said high pressure pump and said membrane/pressure vessel.

3. A portable reverse osmosis water purification plant comprising:

a frame;

a housing on said frame;

a storage area in said housing adapted to receive feed water and product water pumps and internal combustion engines therefor;

a diesel engine in said housing;

a high pressure pump within said housing and mechanically coupled to said diesel engine to be driven thereby;

a primary filter in said housing, said primary filter being a backwashable filter and being connectable to said feed water pump to receive water to be purified therefrom;

a secondary filter in said housing, said secondary filter being a cartridge filter and being connected to said primary filter to receive water to be purified therefrom and to said high pressure pump to provide the water to be purified thereto;

a membrane/pressure vessel having a reverse osmosis membrane and located in said housing and having an inlet connected to said high pressure pump to receive, under high pressure, the water to be purified, and an outlet to discharge purified water;

said outlet adapted to be connected to said product water pump; and an accumulator connected between said cartridge filter and said high pressure pump.

4. The portable reverse osmosis water purification plant of claim 3 further including an additional accumulator connected between said high pressure pump and said membrane/pressure vessel.

5. A portable reverse osmosis water purification plant comprising:

a frame;

a storage area on said frame adapted to receive feedwater and product water pumps and internal combustion engines therefor;

a diesel engine with a self-contained electrical system including an alternator on said frame;

a high pressure pump on said frame and mechanically coupled to said diesel engine to be driven thereby;

a primary filter on said frame, said primary filter being a backwashable filter and being connectable to said feedwater pump to receive water to be purified therefrom;

a secondary filter on said frame, said secondary filter being a cartridge filter and including a cartridge receiving connector formed of a copper-nickel alloy and being connected to said primary filter to receive water to be purified therefrom and to said high pressure pump to provide the water to be purified thereto;

a membrane/pressure vessel having a reverse osmosis membrane and located on said frame and having an inlet side connected to said high pressure pump to receive, under high pressure, the water to be purified, and an outlet to discharge purified water, said outlet adapted to be connected to said product water pump;

first and second accumulators on said frame, one connected on each side of said high pressure pump, for smoothing flow of the water to be purified;

a drawback tank on said frame and connected to said outlet to receive purified water therefrom;

treatment chemical reservoirs on said frame; and an electrically operable injection pump associated with each said reservoir and connected to said alternator.

6. The portable reverse osmosis water purification plant of claim 5 further including a housing on said frame, said storage area, said engine and said high pressure pump being located in said housing.

7. The portable reverse osmosis water purification plant of claim 6 wherein said housing is made up of metal panels.

8. The portable reverse osmosis water purification plant of claim 7 further including a plurality of manually operable valves, and means interconnecting said valves and said primary filter such that said valves may be manually operated to backwash said primary filter.

9. The portable reverse osmosis water purification plant of claim 8 further including feedwater and product water pumps in said storage area and each including a pump connected to an internal combustion engine.

* * * * *